No. 888,257. PATENTED MAY 19, 1908.
E. PASSBURG.
APPARATUS FOR DRYING IN VACUUM.
APPLICATION FILED FEB. 16, 1906.
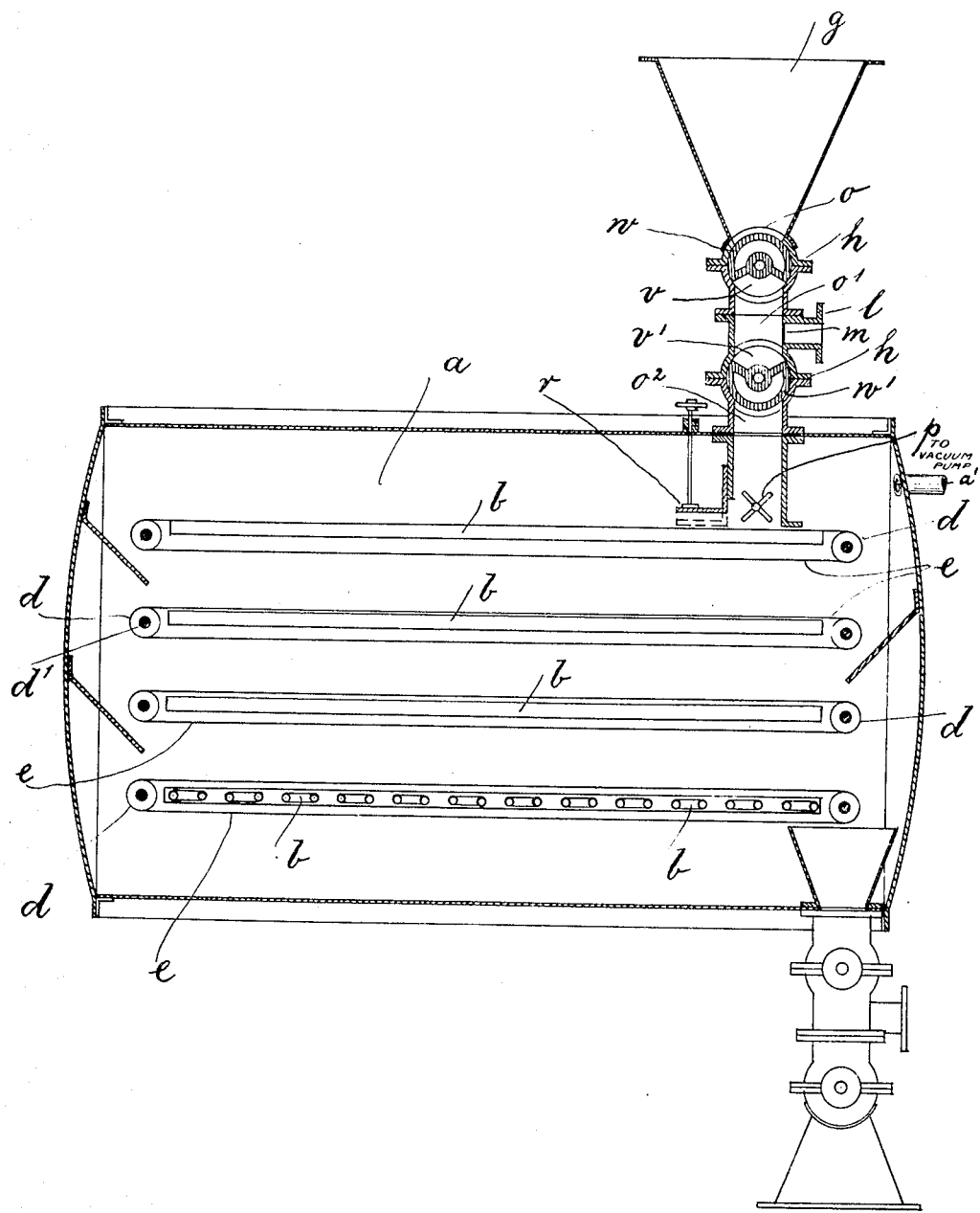
WITNESSES:
Fanny Fisk
H. J. Suhrhier
INVENTOR
Emil Passburg
BY Goeuen Goeuel
ATTORNEYS

UNITED STATES PATENT OFFICE.

EMIL PASSBURG, OF BERLIN, GERMANY.

APPARATUS FOR DRYING IN VACUUM.

No. 888,257.                    Specification of Letters Patent.         Patented May 19, 1908.

Application filed February 16, 1906. Serial No. 301,429.

*To all whom it may concern:*

Be it known that I, EMIL PASSBURG, engineer, a citizen of the German Empire, and resident of Berlin, Germany, 33 Brücken-Allee, have invented certain new and useful Improvements in Apparatus for Drying Pulverized, Granular, and Like Material *in Vacuo*, of which the following is a specification.

This invention relates to improvements in apparatus for drying granulated, cut and fibrous substances as for instance vegetables, fruits, tea and also other solid materials *in vacuo*, the object of the invention being more particularly to allow of subjecting the material to different degrees of temperature at different stages of the drying operation, so that the moister material is exposed to more intense heat than the material which is already partly dried. For this purpose the invention consists in the novel features and combinations of parts to be hereinafter described and claimed.

The invention is illustrated in the accompanying drawing which shows in vertical longitudinal section one form of the improved drying apparatus. The latter comprises a vacuum chamber "$a$" containing a series of hollow heating plates or pipes "$b$" arranged one above the other. At the end of the said plates rollers "$d$" are provided, over which travel endless conveyer-cloths "$e$". The axles "$d^1$" of the said rollers extend through the wall of the vacuum chamber and are adapted to be driven by means of a train of gear-wheels.

The drying chamber $a$ communicates with a suitable vacuum pump (not shown) by a pipe $a^1$, shown in Fig. 1.

For charging the apparatus with material to be dried a hopper "$g$" is provided from which the wet material will pass an inlet apparatus of known construction or the special inlet arrangement of the following construction:

Two rollers "$w$" and "$w^1$" provided with troughs "$v$" and "$v^1$" and adapted to be revolved with equal velocity in air-tight bearings "$h$", the axles of the said parts "$w$" and "$w^1$" being provided with suitable pulleys "$w^2$" and chain or like gear "$w^3$" for the purpose. The space "$o^1$" between the bearings "$h$" communicates by means of a union "$l$" with an air pump not illustrated in the drawing, a fine-meshed sieve or perforated disk "$m$" being placed over the inner orifice of the said union. The air pump with which the latter communicates is independent from the air pump by means of which the vacuum is produced in the chamber "$a$".

The action of the apparatus is as follows: Moist material placed in the hopper "$g$" passes through the lower orifice "$o$" of the latter and fills the trough "$v$" when the rotation of the roller "$w$" causes the said trough to move past the said orifice. During the continued rotation of the roller "$w$" the material in the trough "$v$" is moved downwards and then dropped through the space "$o^1$" into the trough "$v^1$" of the roller "$w^1$". The rotation of the latter causes the said material to be dropped through the space "$o^2$" on the blades on a revolving shaft "$p$", by which it is thrown onto the uppermost conveyer "$e$" underneath a vertically adjustable plate "$r$", which allows of regulating the thickness of the layer of material passing through the apparatus on the conveyers. The air pump communicating with the space "$o^1$" produces a vacuum in the latter, and the sieve or perforated disk "$m$" prevents the suction of the material into the said air pump. This arrangement will also be used for the discharging of the apparatus from the dry material. It is necessary for obtaining a high vacuum in the apparatus, by sucking the air from the space "$o^1$" by a special pump, that the air cannot pass into the vacuum chamber, in which it would decrease the vacuum and in consequence of this influence the drying process.

The discharging of the dried material from the vacuum chamber at the lower part of the latter can also be done with the discharging arrangement known on the vacuum chambers, but from the reasons stated the above described arrangement with the two rollers "$w$" and "$w^1$" has been provided for it.

The plate "$b$" with which the uppermost conveyer "$e$" comes into contact is powerfully heated by means of steam or any other suitable heating agent, the heat being transmitted by the conveyer to the material lying on the latter, so that the moisture in the said material is rapidly evaporated *in vacuo*, the vapor being immediately removed by the air pump. A large amount of heat is rendered latent by the evaporation, so that the material on the conveyer is cooled to a considerable extent, but only to the temperature at which water evaporates in the vacuum used.

From the uppermost conveyer the material successively passes to the lower conveyers in the known manner. If the said lower conveyers were heated to the same degree as the uppermost conveyer, the material would obviously be liable to be scorched or burned, since the quantity of moisture present would be insufficient to absorb the excess of heat. To prevent this scorching or burning, the heating-plates belonging to the lower conveyers are heated to the same temperature as the latter, but so arranged that they are not in contact with the respective conveyers. Thus the lower conveyers and the material thereon are, of course, only heated by radiation, instead of by conduction. The distances of the superposed heating bodies from the conveyers are directly proportional to the drying action which gradually takes place from the upper conveyers toward the lower conveyers.

The apparatus described allows of very rapidly and economically drying moist material, without danger or injury to the latter through the action of excessive heat.

Having now particularly described and ascertained the nature of my said invention and in what manner the same is to be performed, I declare that what I claim is:

In a vacuum drying apparatus, the combination of a drying chamber, a series of conveyers in said chamber to which the material to be dried passes successively, and heaters in proximity to said conveyers and spaced therefrom at different distances, such distances being so regulated as to be directly proportional to the gradual drying action which is to be produced by the series of heated conveyers.

In testimony whereof I affix my signature in presence of two witnesses.

EMIL PASSBURG.

Witnesses:
  HENRY HASPER,
  WOLDEMAR HAUPT.